Oct. 10, 1961 P. L. DATT ET AL 3,004,215
MAGNETIC TESTING DEVICE
Filed Jan. 27, 1958 2 Sheets-Sheet 1

INVENTORS:
PAUL L. DATT
JOSEPH D. SHIPLEY
WILLIAM J. WARREN
BY: *James Todorovic*
THEIR ATTORNEY INVENTORS:
PAUL L. DATT
JOSEPH D. SHIPLEY
WILLIAM J. WARREN
BY: James Todorovic
THEIR ATTORNEY

# United States Patent Office 3,004,215
Patented Oct. 10, 1961

3,004,215
MAGNETIC TESTING DEVICE
Paul L. Datt, Walnut Creek, and Joseph D. Shipley and William J. Warren, El Cerrito, Calif., assignors to Shell Oil Company, a corporation of Delaware
Filed Jan. 27, 1958, Ser. No. 711,356
9 Claims. (Cl. 324—34)

The present invention relates to an apparatus or device for magnetically detecting flaws and other anomalies in metallic members capable of conducting an electric current, and, more particularly, pertains to an apparatus for magnetically testing metallic tubular elements, such, for example, as condenser tubes, boiler tubes, and the like. In one of its more specific embodiments, the invention is directed to a device which is not only capable of magnetically detecting and recording flaws, including circumferential cracks, in metallic tubings of non-magnetic materials, including austenitic steels, i.e. ferruginous but non-magnetic materials, but also variations in the wall thickness of such metallic tubular elements, which wall thickness variations may be due, for example, to causes, such as corrosion, wear, pitting, etc., or to specific design of said tubular elements.

Magnetic devices and systems especially suitable for testing metallic members, e.g. tubular elements, for weaknesses due to flaws, cracks, pits, etc., as well as for the detecting and recording wall thickness variations, are known, and have been described and claimed in the Long patents U.S. 2,540,588 and 2,540,589. The magnetic testing device or probe of these patents includes a core of magnetic material adapted for insertion into the metallic object to be tested, e.g. into an austenitic stainless steel tube, this core carrying two longitudinally disposed and longitudinally spaced co-axial coils wound on this core along the longitudinal axis of the core and therefore of the probe, these two coils having coil factors of predetermined appreciable different magnitudes by reason, for example, of the fact that the two coils have different numbers of turns, or are of wires of different gages, resistivities, etc. or combinations thereof. As described in the above-mentioned patents, the probes of the character outlined above can be used in measuring bridge circuits, e.g. those described and claimed in the above second mentioned patent, to detect and record flaws, wall thicknesses, and the like, of various metallic elements, including tubes.

It has now been found that the above-identified magnetic testing device is relatively insensitive to circumferential cracks in metal pipes. Also, this type of probe is substantially insensitive to any flaws and other anomalies which may be present in those portions of a tubing which are enclosed within or very near a header, such as those in heat exchangers, or under baffles.

It is therefore the main object of the present invention to avoid the above and other defects of the prior art, and to provide a magnetic testing device which is capable of a much wider application than attainable with the presently known probes. It has a further object of the invention to provide a magnetic testing device or probe which is especially sensitive to circumferential cracks in metallic tubings. A still other object is to provide a magnetic testing apparatus which is specifically suited to inspect those portions of pipes or tubing which are encased in a header or disposed under a baffle. It is also one of the objects of the invention to provide an improved probe capable of detecting circumferential cracks in tubing and also defects in portions thereof encased in a header or disposed under a baffle, or the like, which probe is also adapted to examine and detect other types of flaws, cracks, pits, etc. as well as furnishing a complete and accurate record of the relative thickness of the pipe under test. It is still another object of this invention to provide a magnetic testing system especially sensitive to circumferential cracks in metallic, non-magnetic tubings, and particularly those cracks which are in the portions of pipes or tubings encased in a header or disposed under a baffle, said magnetic testing system comprising an indicator and a recorder, said indicator being used to discriminate at a relatively high speed between sound and weakened metallic members (particularly in portions defined above), and said recorder being used to produce a permanent and reproducible record of the test being made.

It has now been found that the above and other objects may be attained by providing a magnetic testing device or probe comprising a core or cores of magnetic material and two coil means wound on said core and disposed along an axis which is at right angle to the longitudinal probe axis, said probe being adapted to be used with a measuring bridge circuit and adapted for controlled movement circumferentially and/or longitudinally within the tubing.

In one of its embodiments the invention comprises a magnetic testing device or probe (for use in connection with a measuring bridge circuit), said probe comprising at least one core of a magnetic material and two-spaced coil means (which may have coil factors of the same or predetermined appreciably different magnitudes), said coil means being wound on said core or cores so that their axes are at right angles to the probe axis, and said probe being adapted to be moved through and along the longitudinal axis of a passage in a metallic object, e.g. tubing to be tested.

The above and other embodiments of this invention will be understood from the following description taken with reference to the attached drawings wherein.

Figure 1:
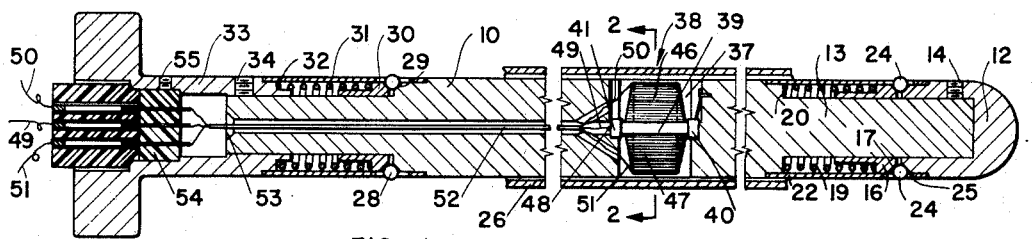
FIGURE 1 is a diagrammatic cross-section view of the magnetic testing device or probe of the present invention.

Referring to the drawings, and particularly to FIGURE 1 (which is a cross-section of one embodiment of the probe assembly), numeral 10 refers to the body of this probe, this body 10 being provided with a cap 12 which slides onto the nose piece 13 of the body 10 and is kept fixedly thereon by means of a set screw 14. A sleeve 16, bevelled at its front end at 17, is disposed on the body 10 behind the nose piece 13, said sleeve being provided with a shoulder against which abuts a spring 19, the other end of which abuts against a shoulder 20 of the body 10. A sleeve 22 surrounds the spring and extends to the cap 12. This sleeve 22 has elongated slots to accommodate balls 24, this slot permitting a limited movement of the balls along an axis at right angle to probe axis. A series of ball bearings 24 is disposed between cap 12 and sleeve 16, the latter pressing against the ball bearings 24, which (because of the bevelled edges 17 and 25 of sleeve 16 and cap 12, respectively) are forced against the walls of any pipe, e.g. pipe 26 through which the probe is passed, thus maintaining said probe substantially centrally therewithin.

A second set of ball bearings 28 is disposed on the periphery of body piece 10 closer to or near the opposite end, these ball bearings abutting against a bevelled edge 29 of 10, and being pressed outward by means of sleeve 30 which is forced against the ball bearings by a spring 31 held in place by an outer sleeve 32; the rear end of spring abuts against an element or member 33 held fixedly on the back end of body piece 10 by means of set screw 34.

Figure 2:
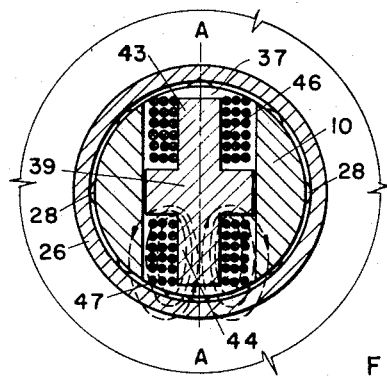
FIGURE 2 is a cross-section taken along line 2—2 of FIGURE 1.

The central portion of the body piece 10 is hollowed out as shown more particularly by numeral 37 in FIGURES 1 and 2, this for the purpose of disposing therein the probe core and probe coils (forming the particular subject of the present invention). The probe core 38, in one of the embodiments of the invention, has the general shape shown more particularly in FIGURE 3. This core body consists of a central part or mandrel 39, having its end 40 and 41 held in place in the body piece 10; the mandrel 39 being also provided with upwardly and downwardly projecting pole pieces 43 and 44, which are somewhat narrower and shorter than the central member or mandrel 39. The core is generally made of a metal having a high permeability. Obviously, ends 40 and 41 could be expansions of 39.

As shown in the drawings, and particularly in FIGURE 2 thereof, coils 46 and 47 are wound around core members 43 and 44, respectively, in such a manner that the axis through the coils is at right angles to the longitudinal axis of the probe per se. Each coil comprises a desired number of turns, such as from 100 to 5,000, of an insulated wire. The coils 46 and 47 are connected to each other and preferably grounded at their connected ends, for example, by soldering or otherwise electrically connecting them to the mandrel 39, which is in turn connected at 48 to the grounded conductor 49. The other ends of coils 46 and 47 are connected by means of wires 50 and 51 to the other conductors in cable 52, which latter passes through opening 53 in body 10, bringing them respectively through the terminals in rear plug 54 held in place in the probe by set screw 55.

Figure 3:
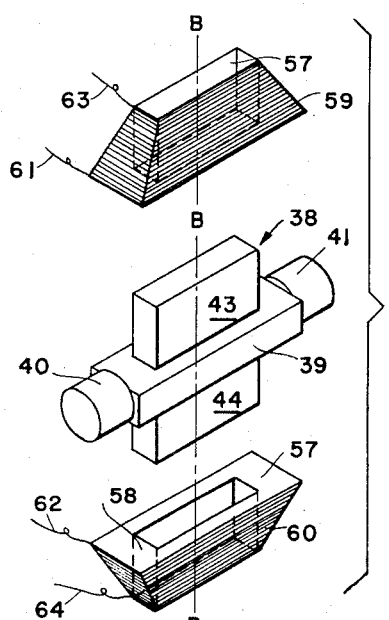
FIGURE 3 is an exploded view in perspective of one embodiment of the core-and-coils elements of a probe of the present invention.

FIGURE 3 shows the probe core similar to, if not identical with that of FIGURE 2, and shows a slightly modified manner of disposing the electric coils on the magnetic core members 43 and 44. In this case, in order to prevent any shorting which might occur between the core and the coil (particularly at the edges), each coil is wound on a form 57 of insulating material, e.g. paper, this form 57 (which may be in the shape of a truncated pyramid) having a part 58 adapted to fit over the core member 43 or 44, respectively. Coils 59 and 60 are wound on these forms 57. As in FIGURE 1, ends 61 and 62 are connected to each other and extend as the central wire 49 of FIGURE 1, while wires 63 and 64 constitute the other two wires which lead out of the probe device as wires 50 and 51, respectively, of FIGURE 1.

Figure 4:
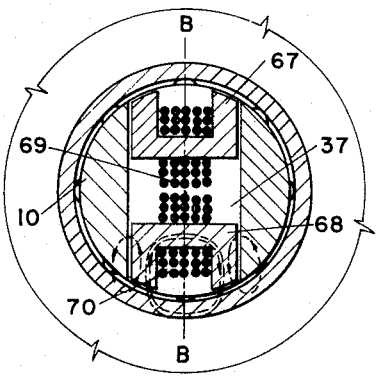
FIGURE 4 is a cross-section taken along a line similar to line 2—2 of FIGURE 1, but showing another embodiment of the core-and-coils elements of a probe made in accordance with the present invention.

Instead of disposing the core-and-coils combination in the manner shown in the first three figures, the arrangement disclosed in FIGURE 4 can be used with substantially equal results. In this case two cores 67 and 68 are disposed in slot or aperture 37, these cores being U-shaped in cross-section and being shorter than the longitudinal space of slot 37 in the body element 10. This permits the winding of the wires on the cores 67 and 68 so that each is provided with its respective coil 69 and 70, respectively. The terminal wires are then connected in the manner described above in connection with the description of FIGURE 1. The dotted oval lines in FIGURES 2 and 4 are typical flux lines.

Figure 7:
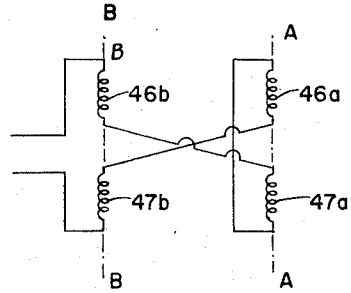
FIGURE 7 is a schematic diagram of another probe of the present invention.

In some cases, particularly when it is desired to correct or compensate for any eccentricity of the probe in the tubing being tested, it is possible, if not desired, to use an auxiliayr core-coil assembly of the present invention in combination with a principal core-and-coil combination, such as one of those disclosed above and shown in FIGURES 1–4. In other words, one then uses either two sets of combinations, e.g. those shown in FIGURES 2, 3 or 4, or, for example, a core-and-coil combination of FIGURE 2 with an assembly shown in FIGURE 4. In any case the two assemblies are preferably spaced axially as shown in FIGURE 7, i.e. along the probe axis, with their axes A—A and B—B parallel to each other. These two coil assemblies 46a—47a and 46b—47b can thus be disposed in slots or aperture such as aperture 37 in body 10 (FIGURES 1 and 2), these slots having parallel axes and disposed longitudinally apart along probe axis. The electromagnetic properties of the auxiliary combination are suitably chosen to be used with those of the main coil-core unit to compensate electrically for the effects of eccentricity of the probe within the cylindrical passageway, e.g. tubing. For this purpose the upper coil, e.g. coil 46a of FIGURE 7, and the lower coil, e.g. coil 47b of FIGURE 7, are placed in series to constitute one of the branches of bridge C (e.g. coil 80 thereof), while coil 47a and coil 46b, also in series, will then constitute coil 81, i.e. the other probe coil of the bridge.

Figure 5:
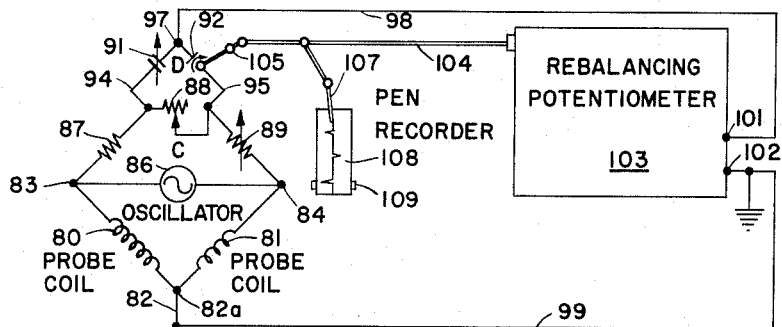
FIGURE 5 is a schematic connection diagram of a system to be used in connection with a testing device or probe of the present invention.

The measuring bridge circuit shown in FIGURE 5 is a compound or double bridge of a type comprising a main bridge C and an auxiliary bridge D. The probe coils 80 and 81 (which may be the coils 46 and 47, respectively, of FIGURES 1 and 2) are respectively connected into two arms of the main bridge C, wire 49 of FIGURE 1 being the same as wire 82, while wires 50 and 51 leading to terminals 83 and 84 of FIGURE 5.

An alternating current supply source 86, which may be of the variable frequency type, e.g. electronic audio frequency oscillator having a range of from about 20 to 20,000 cycles per second, has its power output terminals connected to 83 and 84 of the measuring bridge circuit.

The other two arms of bridge C are formed by variable impedance or resistance means shown by elements 87, 88 and 89, one of these arms comprising, for example, resistance 87 and an adjacent portion of the intermediate resistance 88, while the other arm comprises resistance 89 and an adjacent portion of the resistance 88. The apparent or effective division of resistance 88 between these two arms is at that point on resistance 88 which has the same potential as point 82a intermediate the two coils 80 and 81. The two portions into which the resistor 88 is thus divided also forms two arms of the auxiliary bridge D. Impedance or reactance means, such as a condenser 91 (which may be variable) and a variable condenser 92, having a movable, automatically adjustable plate or plates, form the other two arms of the auxiliary bridge D being connected across the resistance 88 at points 94 and 95.

The measuring bridge circuit is connected at points 97 and 82a, via lines 98 and 99 respectively, to the input terminals 101 and 102 of an automatic rebalancing potentiometer unit which, per se, forms no part of the invention and is shown in the form of a block diagram at 103. This unit comprises the usual preamplifier galvanometer, amplifier, discriminator, and motor circuits, whereby a bridge unbalances voltage appearing between terminals 101 and 102 is used to cause a mechanical motion of an element, such as an arm 104, which resets, for example, through a pivoted linkage 105, the movable element or plant of condenser 92, and thus rebalances the bridge to a new condition of voltage equilibrium between points 97 and 82a. At the same time, a pen 107, or the like, mechanically linked to the arm 104, records this change in the balance conditions of the bridge on a chart element 108 driven by a mechanism 109 of the clock-work type. In operation, a magnetic testing device or probe of the type shown in FIGURE 1 is inserted into the tube under test and an alternating current is delivered to coils 46 and 47 (which as stated are the same as coils 80 and 81 of FIGURE 5). The magnetic field thus generated induces eddy currents in the test object, e.g. tubing, which currents react back on coils 46 and 47 and thus modify the impedance values of these coils. When the probe element is moved through normal portions of the tube the magnetic field surrounding the coil is substantially constant. However, when the probe element passes into the tube portion having a defect, e.g. a circumferential crack in its wall, the resulting field disturbance reacts on the probe coil and causes the measuring bridge to become unbalanced. This results in an unbalanced voltage appearing across points 97 and 82a, which voltage is transmitted to rebalancing unit 103, and is used to move arm 104 so as to actuate the movable element of the variable condenser 92 so as to restore the balance of the measuring bridge. At the same time the movement of arm 104 is recorded on chart 108.

Figure 6:
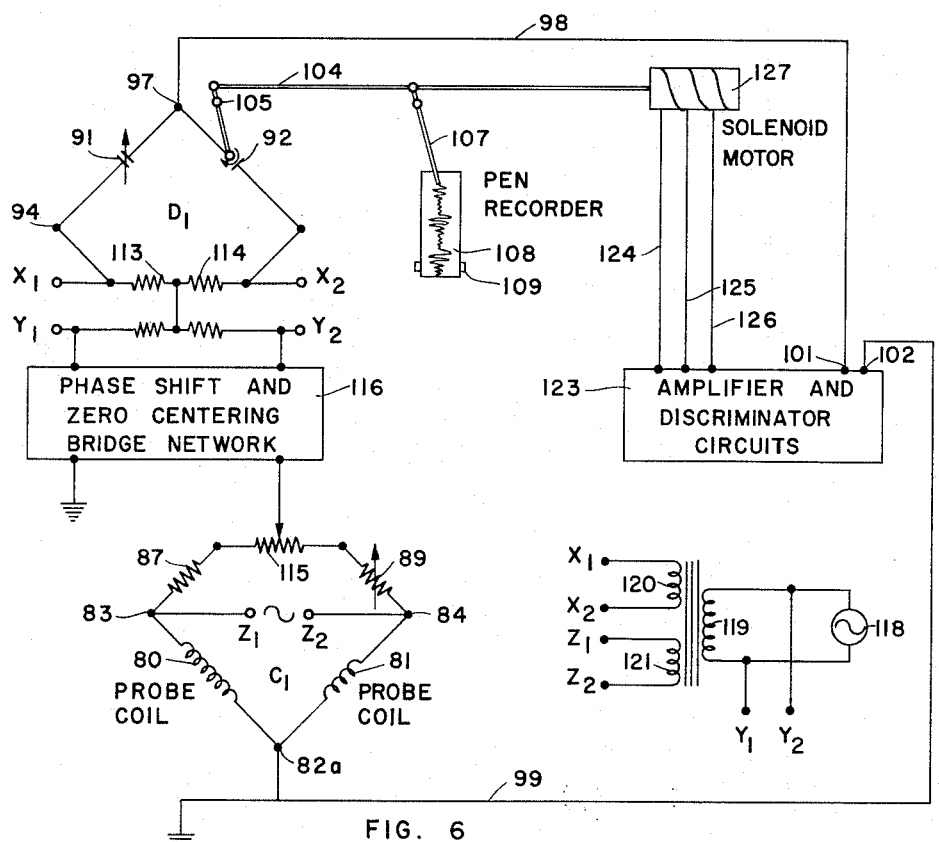
FIGURE 6 is a schematic diagram of another embodiment of the system.

A slightly modified embodiment of the measuring bridge circuit system is shown in FIGURE 6 wherein elements identical or corresponding to those of FIGURE 5 are denoted by the same numerals. The compound measuring circuit of FIGURE 6, like the one in FIGURE 5, consists of a main bridge $C_1$ and an auxiliary bridge network $D_1$ having parallel branches comprising impedances formed by condensers 91 and 92 and resistances 113 and 114, and connected to an intermediate portion of resistance 115 of the main bridge $A_1$ through a suitable phase shift and zero centering bridge network 116 which provides for a ready adjustment of the phase angle and of the recorder pen 107 to any selected zero line or chart 108. The compound measuring circuit is energized from an oscillator 118 through a transformer having a primary 119 and secondaries 120 and 121, connection terminals being indicated at $X_1$, $X_2$, $Y_1$, $Y_2$, $Z_1$ and $Z_2$.

In this case a potential appearing across points 97 and 82a of an unbalanced measuring bridge is transmitted to the electronic amplifier and discriminator circuit of unit 123 which serve to amplify these voltage pulses and to apply them selectively through leads 124 and 125, or 125 and 126, depending on their polarity to the solenoid motor 127 causing said motor to move rod 104 actually in one or the other direction for the purposes described above.

It was mentioned above that the two coils constituting a probe pair may have the same coil factors or coil factors of predetermined appreciably different magnitudes. In the first case, the probe is relatively insensitive to a change of average wall thickness of a tubing over a length thereof at least equal to the axial dimension of the core-coil assembly, while this is possible with probes of the second type, i.e. where the two coils have factors of different magnitudes. This latter may be obtained, for example, by winding the coils of wires of different alloys, giving them different effective resistances. Coils wound of wire of different gage will also differ from each other in inductive reactance, even when having the same number of turns. The values of the inductive reactance of the two coils may be further made different from each other by using unequal number of turns for each coil or a symmetrical magnetic core(s). The coils may also be wound of wires of different gage so that one of the coils has a portion of its winding reversed, thus further varying its total effective reactance and resistance as compared with that of the other coil.

We claim as our invention:

1. A probing device comprising; a probing device disposed to be inserted into a tubular member, two cores of magnetic material disposed along a transverse axis of the probing device and on opposite sides of the center of said transverse axis, and a single coil means wound on each of said cores, the axes of said coil means being disposed along an axis at right angle to and passing through the longitudinal axis of the probing device, said coil means being further adapted to constitute two sides of a measuring bridge circuit.

2. A probing device according to claim 1 wherein both of said coil means have coil factors of substantially same magnitudes.

3. A probing device according to claim 1 wherein said coil means have coil factors of predetermined appreciably different magnitudes.

4. A probing device according to claim 1 wherein each of said coil means has a different number of turns.

5. A probing device comprising a housing adapted for controlled movement through cylindrical tubing, two pairs of coaxial coils disposed in said housing with their axes at an angle to the axis of the housing and wound on cores of magnetic material, the axis of one pair of said coils being parallel to and displaced from the other pair of coils along the longitudinal axis of the housing, each coil of one pair being serially connected with the diagonally opposite coil of the other pair.

6. A probing system for magnetically testing cylindrical tubing comprising a probing device including a housing adapted for controlled movement through the tubing and two pairs of coaxial coils disposed in said housing and wound on magnetic cores so that one pair of said coils is parallel to and displaced from the other along the longitudinal axis of the housing, each coil of one pair being serially connected with the diagonally opposite coil of the other pair, and a measuring circuit bridge, said two sets of serially connected coils constituting two sides of said bridge.

7. A probe for use with a measuring bridge circuit comprising: an elongated body member; a recess formed in said body member for receiving a coil structure; said coil structure including a magnetic core having opposed coil receiving portions, a single coil being disposed on each of said coil receiving portions of said magnetic core and said coil structure being disposed in said recess with the axis of said single coils at right angles to the axis of said elongated member.

8. A probe for use with a measuring bridge circuit comprising: an elongated body member; a recess formed in said body member for receiving a coil structure; said coil structure including a magnetic core having opposed coil receiving portions, a single coil being disposed on each of said coil receiving portions of said magnetic core; said coil structure being disposed in said recess with the axis of said single coils at right angles to the axis of said elongated member and centering means disposed on said elongated body member to center the probe within a tubular member.

9. A probe for use with a measuring bridge circuit comprising: an elongated body member; a recess formed in said body member for receiving a coil structure; said coil structure including a magnetic core having opposed coil receiving portions, a single coil being disposed on each of said coil receiving portions of said magnetic core; said coil structure being disposed in said recess with the axis of said separate coils at right angles to the axis of said elongated member and a plurality of circumferentially spaced ball members disposed on the periphery of said elongated body member, a resilient means disposed to force said ball members radially outwardly to center the probe in a tubular member.

References Cited in the file of this patent

UNITED STATES PATENTS

| | | |
|---|---|---|
| 1,815,710 | Guillemin | July 21, 1931 |
| 2,540,588 | Long | Feb. 6, 1951 |
| 2,746,012 | Price | May 15, 1956 |

FOREIGN PATENTS

| | | |
|---|---|---|
| 575,480 | Germany | Apr. 28, 1933 |
| 746,936 | Germany | Aug. 30, 1944 |
| 631,988 | Great Britain | Nov. 14, 1949 |